(12) United States Patent
Weinstock et al.

(10) Patent No.: US 10,520,651 B2
(45) Date of Patent: Dec. 31, 2019

(54) VOLTAGE ADJUSTABLE NEAR-EYE OPTICAL LENS

(71) Applicant: SoliDDD Corp., Brooklyn, NY (US)

(72) Inventors: Neal Weinstock, Brooklyn, NY (US); David Hayes, Aurora, OH (US)

(73) Assignee: SOLIDDD CORP., Brooklyn, NY (US)

( * ) Notice: Subject to any disclaimer, the term of this patent is extended or adjusted under 35 U.S.C. 154(b) by 171 days.

(21) Appl. No.: 15/584,693

(22) Filed: May 2, 2017

(65) Prior Publication Data

US 2018/0321426 A1 Nov. 8, 2018

(51) Int. Cl.
| | |
|---|---|
| *G02B 3/08* | (2006.01) |
| *G02B 3/00* | (2006.01) |
| *G02B 3/14* | (2006.01) |
| *G02B 27/01* | (2006.01) |
| *G02B 1/04* | (2006.01) |
| *G02B 7/00* | (2006.01) |
| *G02B 7/02* | (2006.01) |
| *G02B 7/04* | (2006.01) |
| *G02B 7/36* | (2006.01) |
| *G02B 19/00* | (2006.01) |
| *G02B 23/12* | (2006.01) |

(Continued)

(52) U.S. Cl.
CPC .............. *G02B 3/08* (2013.01); *G02B 3/0081* (2013.01); *G02B 3/14* (2013.01); *G02B 27/0172* (2013.01); *G02B 1/041* (2013.01); *G02B 3/0006* (2013.01); *G02B 7/002* (2013.01); *G02B 7/003* (2013.01); *G02B 7/021* (2013.01); *G02B 7/023* (2013.01); *G02B 7/04* (2013.01); *G02B 7/36* (2013.01); *G02B 19/00* (2013.01); *G02B 23/125* (2013.01); *G02B 27/0012* (2013.01); *G02B 27/0025* (2013.01); *G02B 27/0068* (2013.01); *G02B 27/02* (2013.01); *G02B 27/10* (2013.01); *G02F 1/0045* (2013.01); *G02F 1/0123* (2013.01); *G02F 1/0316* (2013.01); *G02F 1/13* (2013.01)

(58) Field of Classification Search
CPC .... G02C 11/10; G02C 7/083; G02C 2202/20; G02C 7/06; G02B 27/0172; G02B 2027/0178
USPC ................. 351/158, 41; 349/8, 7, 11, 15, 13
See application file for complete search history.

(56) References Cited

U.S. PATENT DOCUMENTS

| | | | |
|---|---|---|---|
| 6,177,966 B1 | 1/2001 | Masuda et al. | |
| 8,657,438 B2 * | 2/2014 | Jacobs | G02B 26/026 351/49 |

(Continued)

FOREIGN PATENT DOCUMENTS

JP 2012123041 A 6/2012

OTHER PUBLICATIONS

International Search Report for Application PCT/US2018/030450, dated Sep. 26, 2018, 6 pages, European Patent Office, The Hague, Netherlands.

*Primary Examiner* — Hung X Dang
(74) *Attorney, Agent, or Firm* — Ference & Associates LLC

(57) ABSTRACT

An apparatus and system that uses lenses in front of a display screen to correct the vision of a user in near-eye display devices. The lenses replace the fixed lenses of typical near-eye display devices. The lenses have a wide range of adjustability such that users that require corrective eyeglass lenses or contacts can bring the displayed image into proper focus. This allows a user to experience near-eye display devices without the need for additional corrective lenses.

20 Claims, 4 Drawing Sheets

(51) Int. Cl.
*G02B 27/00* (2006.01)
*G02B 27/02* (2006.01)
*G02B 27/10* (2006.01)
*G02F 1/00* (2006.01)
*G02F 1/01* (2006.01)
*G02F 1/03* (2006.01)
*G02F 1/13* (2006.01)

(56) References Cited

U.S. PATENT DOCUMENTS

2003/0189766 A1  10/2003  Nishioka et al.
2004/0164927 A1   8/2004  Suyama et al.
2010/0245743 A1   9/2010  Yokoyama
2011/0267570 A1  11/2011  Saito et al.

\* cited by examiner

VOLTAGE ADJUSTABLE NEAR-EYE OPTICAL LENS

FIELD OF THE INVENTION

The present invention relates generally to optic systems, and, more particularly, to optics for vision correction and to the optics for virtual reality and augmented reality.

BACKGROUND OF THE INVENTION

Recently, there has been significant growth in the use and advancement of virtual reality, augmented reality, and similar near-eye products. Common virtual reality uses include video gaming, movies, amusement ride simulators, and the like. While the popularity is driven by entertainment, the products also serve functions in training and education. For example, virtual reality headsets may be used for flight simulation training, surgery simulation for physicians, technology in the traditional classroom to spark student interest in a subject, and the like.

One current method of producing a virtual reality simulation is the use of a headset. The headset generally contains a display with lenses placed between the eyes and display. The display may be inserted by a user, for example, the user may insert a smartphone, tablet, or other display device, in a display holder on the virtual reality headset. Alternatively, the virtual reality headset may include the display as a manufactured part of the headset. The lenses within the headset serve to focus and reshape the image perceived by the eyes. In this manner, a 3-dimensional image is formed from 2-dimensional images displayed on the display screen.

Wearing corrective lenses in conjunction with near-eye displays presents many problems. For example, if a user wears corrective eyeglasses, the eyeglasses may become scratched by the lenses or other parts of the virtual reality headset. Additionally, depending on the size of the corrective eyewear, the eyewear may not physically fit within the virtual reality headset, for example, due to oversized corrective lenses or frames, small virtual reality headset openings, and the like. Additionally, due to the distance between the eyewear and the near-eye display of the virtual reality headset, the user's ability to focus on the objects may be hampered. For example, users that wear contacts often report problems when using near-eye displays because contacts do not allow a user to focus well on objects close to the eye.

What is needed is a way for users that require corrective lenses to use near-eye displays, such as a virtual reality headset, without wearing corrective eyeglasses or contacts.

SUMMARY OF THE INVENTION

In accordance with the present invention, a method and system uses a thin flat-panel liquid crystal device that fits directly in front of a display screen. The device allows the screen to be used as a near-eye display. The device replaces the fixed lenses of a virtual reality (VR) headset. The device has a wide range of adjustability such that users who typically require corrective eyeglasses or lenses can use the device without the use of the corrective eyewear.

Change in voltage applied to the device is used to bring the image as seen through the lens in proper focus for the user. One embodiment of the device utilizes a Fresnel lens. The lens is made of a low-birefringent material that is molded of polymer or glass and embedded within a liquid crystal (LC) cell. As the LC material is excited by the applied voltage, the material bends light in relation to the voltage applied. This bending accentuates or lessens the diopter effect of the molded, embedded prisms. Proper selection of LC material with specific birefringent and specific voltage application limit objectionable prism effects in the image visible to the user.

As either the user or a software controlled system adjusts a potentiometer to change voltage, the LC material within the cell becomes excited as a result of the applied voltage. Uniquely because of the presence of the molded prisms within the cell, this excitation essentially happens from the bottom up; in other words, LC material toward the base of the prisms shifts its state first and more fully at initial application of voltage and at lower overall voltage than does the LC material located closer to the peaks of the prisms. The invention makes use of this effect, which is only present in a LC cell that incorporates such prisms, to bend light that passes through the lower area of the well between each molded prism differentially from that located more towards the peaks of the cells. The precise amount of that differential is dependent on prism shape, specific LC material used, and the amplitude and frequency of the applied voltage. It can thus be appreciated that the resulting bending of the lens material changes the diopter effect of the molded prisms in potentially very complex ways, allowing the creation of complex and subtle optical effects.

As a result of this device situated between the display screen and the user's eyes, the user can forgo the use of corrective eyewear while using this near-eye display. The wearing of corrective lenses presents many challenges to a user. For example eyeglasses may not fit into a VR style headset, or the size of the eyeglass frames and eyeglass lenses may be too small to properly correct vision in the entire field of view. Also, contact lens users have difficulty focusing on objects very close to the eye such as near-eye displays. The present device offers advantages to the use of corrective eyewear in conjunction with near-eye displays. The device may also be used to correct vision in general circumstances, substituting for ground- or molded glass or plastic eyeglasses.

A BRIEF DESCRIPTION OF THE DRAWINGS

DETAILED DESCRIPTION OF THE INVENTION

In accordance with the present invention, an embodiment provides a system and method for replacement of lenses in a virtual reality headset. The system and methods as described herein provide lenses with a wide range of adjustability so that any user, including a user requiring corrective eyewear, can adjust the focus of the lenses in order to use the virtual reality headset. For example, the user can adjust the lens in order to adjust the perceived visual focus for the user of a near-eye display. Additionally, the systems and methods as described herein provide an eyeglass replacement lens that can be used to replace standard lenses in corrective eyewear. The eyeglass replacement lens allows a user that requires corrective lenses to adjust the diopter effect of the lens(es) to change the correction value of the lens.

The replacement lens, for both the virtual reality or augmented reality headset and the corrective eyewear, may comprise a liquid crystal cell. In one embodiment, the liquid crystal cell may be formed around a hard plastic prism array, for example, of a Fresnel lens. Voltage may be applied to different areas of the replacement lens, thereby activating the liquid crystal material. Activating the liquid crystal material causes a change in the way light bends when passing through the device, thereby changing the refractive power or diopter of the lens. Accordingly, using the present apparatus, a user can enjoy near-eye displays without the need to wear corrective lenses. The invention also may be deployed to replace corrective eyewear in more common applications, for example, bifocals, standard eyeglasses, reading glasses, and the like, without needing to replace the eyeglasses or lenses whenever the corrective value of the eyeglasses needs adjusted.

Figure 1:
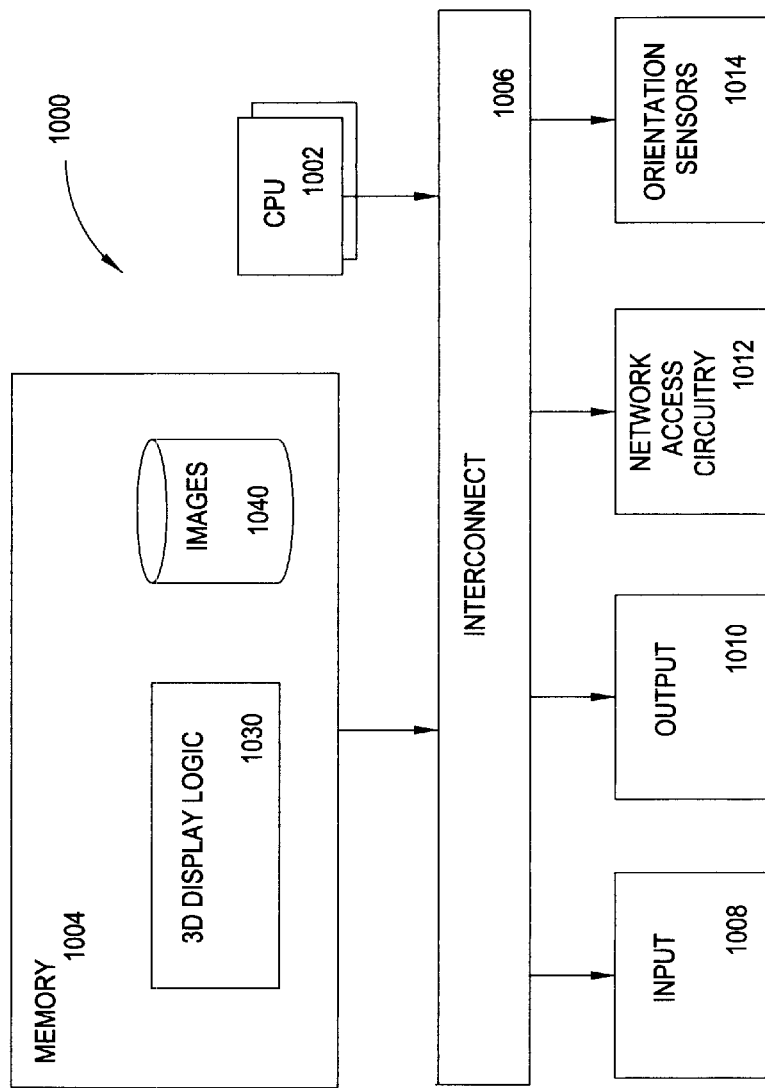
FIG. 1 is a block diagram showing an example apparatus device.

Referring to FIG. 1, a device 1000, for example, a device used as the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a thumbdial, a knob, a keyboard, a keypad, a touch-sensitive screen, a mouse, and a microphone. Output devices 1010 can include a display—such as a liquid crystal display (LCD)—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user.

Information handling device circuitry, as for example outlined in FIG. 1, may be used in devices such as virtual reality headsets, augmented reality headsets, tablets, smart phones, personal computer devices generally, and/or electronic devices which may be used in or as near-eye displays screens for a user. The circuitry may also be used in devices for corrective eyewear.

A diopter is a unit of measure of the optical power of a curved mirror or lens. The diopter is equal to the reciprocal of the focal length. For example, the optical power of a lens with a focal length of 1 meter (~39 inches) is 1 diopter, and the optical power of a lens with a focal length of ⅓ of a meter is 3 diopters. Corrective lenses with a positive dioptric value correct hyperopia, commonly referred to as farsightedness, and corrective lenses with a negative dioptric value correct myopia, or nearsightedness. Human conditions such as aging, eye injury, congenital defects, diabetes, high blood pressure, and glaucoma contribute to the need for corrective lenses. Despite technological innovations in visual display, the method of providing and creating corrective lenses largely remains unchanged.

Additionally, problems arise for users of near-eye display devices, especially when the user wears corrective lenses, because the focal length is reduced to mere inches from the eye. Due to the very short distance between the corrective lenses and the display, the corrective lenses do not provide the correct focal correction and the image or object at such a close proximity looks blurry and/or distorted. Accordingly, a person requiring corrective lenses is generally unable to visualize something at such a close distance.

Figure 2:
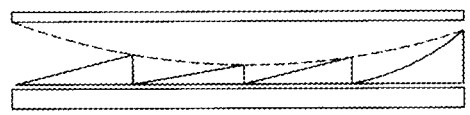
FIG. 2 is a structural diagram showing a side view of the layers of a lens in an embodiment.

Accordingly, an embodiment provides a system and method for replacement lenses. The replacement lenses can be used in both or either a near-eye display, for example, a virtual reality or augmented reality headset, and/or corrective eyewear as replacement lenses. The replacement lens may include a liquid crystal cell with a prism structure, for example, a Fresnel lens prism array. For example, FIG. 2 illustrates an example embodiment of an eyeglass replacement lens as a layered substrate shown in a side view. The layers may include a glass substrate, an electrode array, a prism array, a liquid crystal, and a plastic substrate. In an embodiment, the prism array may be a Fresnel lens.

The prism array may be located either inside or outside the cell. A prism array outside the cell may be located either in front of or behind the cell. In an embodiment, there may be one or more prism arrays and one or more cells. In an embodiment with multiple prisms, the prisms may be in alignment or offset. In an embodiment with multiple prism arrays, the prism arrays may have similar or different curvatures. The prisms may be made of a material of polymer, glass, or a combination.

The substrate may be made of a material of polymer, glass, or combination. The cell may be made of a material of polymer, glass, or combination. The electrode array may be of different shape or configuration including a ring pattern, an XY matrix, a grid, or the like. The apparatus and system as described herein contemplates that the replacement lens in the near-eye display would be placed in a location between a display or visual field, and the user's eyes.

Due to the positioning of the molded prism array, the construction and the behavior of the LC cell are particularized, in changes from normal LC cell construction and behavior. For example, the molded and embedded prisms obviate the normal need for spacers or posts to be used to maintain the appropriate gap between sides of the cell, thus simplifying manufacturing and eliminating chromatic aberrations normally caused by such spacers or posts. Except for the use of the embedded prisms, the type of LC cell design may be a normal TN (twisted nematic), Pi or ECB (electronically controlled birefringent) cell. However, in a typical implementation, either a Pi or ECB-like system will be used. (Although ECB cells have much slower response time than LC's typically used for displays, fast response is not required for this invention and thus ECB techniques may be used to greatly reduce power consumption.) Nonetheless, the presence of the molded prisms within the cell changes the cell response to voltage; the LC material never attains normal "splay" state, thus we refer this invention as a variety of "bend" cell. This also changes the manner in which voltage is applied to the cell and allows for a variety of patterns in which electrodes (typically applied in a normal way with ITO sputtering or other common prior art) are applied to the sides of the cell.

To change the diopter of the replacement lens, voltage may be applied to the liquid crystal material. Applying voltage to the lens to change the directional orientation of the molecules of the liquid crystal material changes the resultant bending of the light through the lens, which adjusts the diopter effect of the lens. Activation of the liquid crystal material is accomplished through application of voltage to the lens using a power source. The voltage may be applied in different amplitudes or frequencies to different regions of the liquid crystal cells. This may result in different parts of the lens having different diopter values. Accordingly, when a user looks through each part of the replacement lens, that portion of the lens is perfectly adjusted for the distance between the lens and the display. As an example, if the lens is curved, as with typical lens or eyeglass lenses to match the curve of a wearer's face or eye, the distance between the lens and the display near the center of the lens will be different than the distance between the lens and the display near the outside of the lens.

In the case of a replacement lens using a Fresnel lens, the Fresnel structure has a specific diopter. For example, the Fresnel structure may be made of a low-birefringent polymer having a specific diopter. The liquid crystal material surrounds the Fresnel lens, and the liquid crystal material is voltage sensitive. Thus, to change the diopter of the replacement lens including a Fresnel lens, the voltage would be applied to the liquid crystal material as discussed above. For example, differential voltage applied to different liquid crystal cells in different areas of the eyeglass replacement lens, which surrounds the Fresnel lens, allow for a change in the diopter value for the entire apparatus. The change in diopter value adjusts the focus perceived by the user.

Figure 3:
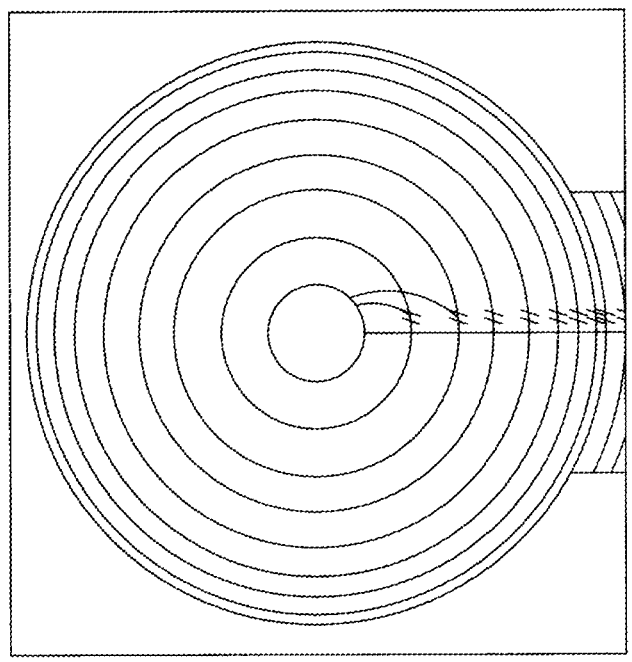
FIG. 3 is a structural diagram showing a front view of a pair of lenses in an embodiment.
Figure 3:
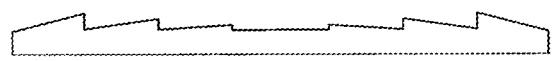

An embodiment shown in FIG. 3 shows the eyeglass replacement lens. This embodiment of the eyeglass replacement lens further comprises a ring electrode design for providing voltages to the lens in a circular pattern. Other patterns for electrodes may also be used, in order that they may, optimally, provide different voltage potentials to be applied to different areas of the liquid crystal material, which changes the diopter effect of the lens related to the voltage applied. The typical embodiment would deploy the kind of vertical/horizontal matrix pattern of electrodes used in typical LC displays to affect each pixel in a display, thus allowing for differential voltage to be applied to all X,Y coordinates of the lens and thus allowing for complex changes to be made to the shape of the overall lens. Other patterns may also be deployed. The system may also work with the same voltage applied to the entire liquid crystal cell, thus changing the diopter effect of the lens in all areas equally.

For one example, in an embodiment using a ring electrode pattern, different voltages may be applied to the different electrode rings to result in a multiplier effect for the original diopter of the Fresnel pattern created by the embedded, molded prisms, with each of the rings being used to supply a different additional amount of bending to the light in that area of the Fresnel pattern. For another example, in an embodiment using a horizontal/vertical matrix of electrodes as used in typical liquid crystal displays with a pixel pattern, each given matrix point determined by X and Y coordinates may be supplied with different voltage so as to change the effective shape of the lens made by the embedded, molded prisms in much more complex ways. Many different patterns both for the embedded, molded prisms and for the delivery of voltage to the liquid crystal material may be deployed. The above are but two examples of many embodiments and are not intended to be limiting.

Voltage may be changed in either or both frequency and amplitude, creating various effective prism shapes out of the liquid crystal material. As discussed briefly above, voltage excites the liquid crystal material successively in layers ordered from the deepest parts of the wells between molded prisms, successively layer after layer towards the tops of the prism structures, which subsequently bends light at angles in relation to the voltage applied. This bending of light either accentuates or lessens the diopter effect of the overall lens, based on the original diopter factor embodied in the molded and embedded prisms within the liquid crystal cell. The hard plastic Fresnel prism inserts, combined with the voltage sensitive liquid crystal material, allow for minimal power consumption while maximizing the possible range of diopters throughout the lens.

Figure 4:
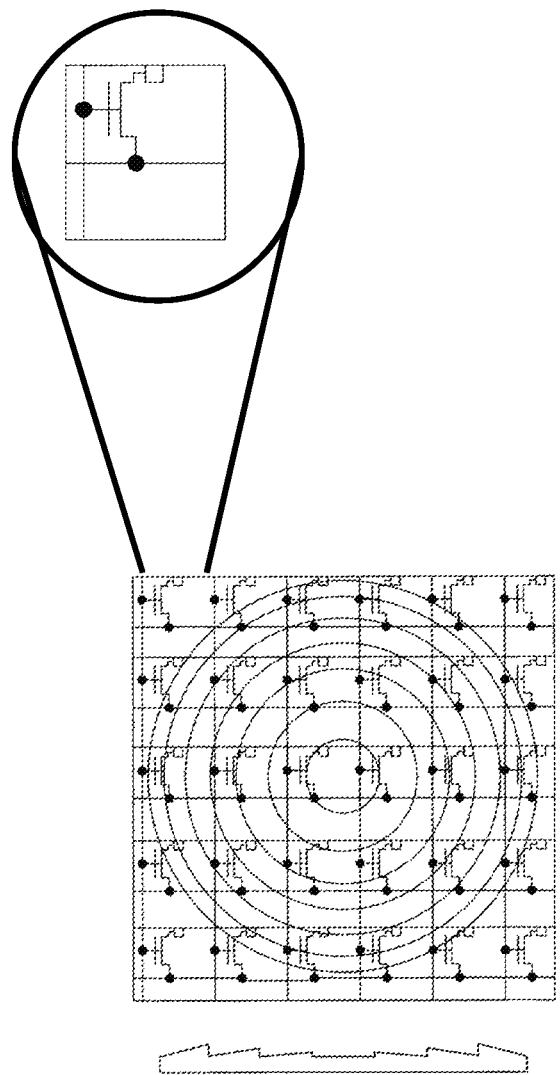
FIG. 4 is a structural diagram showing a front view of a pair of voltage sensitive lenses in an embodiment.

FIG. 4 illustrates an embodiment of an eyeglass replacement lens shown in a side view and a front view. Rather than the ring pattern electrode array as discussed in conjunction with FIG. 3, the replacement lens may comprise a pixel-like array for voltage application. The pixel-like array allows different voltage potentials to be applied to different sections of the liquid crystal material on a smaller scale, for example, by pixel or smaller section. As discussed above, this differential voltage application changes the diopter effect of the eyeglass replacement lens in relation to the voltage potential. The hard plastic Fresnel prism inserts, combined with the voltage sensitive liquid crystal material, allow for minimal power consumption while maximizing the possible range of diopters.

Minimal power consumption with a hybrid ECB/bend cell design reduces the required power supply needed. This reduces the weight of the device. Reduction in power is important for a device that may be a portable electronic device such that the user may not need to carry extra batteries or may not need to keep the device connected to a charger or external power supply. Minimal power consumption and the resulting reduction of power storage and supply also keep the weight of the device minimal. Reduction of weight may be particularly important in a near-eye display application because these headsets are typically worn on the head. The reduced weight minimizes the bulk of the unit, reduces muscle strain, and allows the user greater range of motion when using the device.

One embodiment may include one or more control or adjustment knobs, switches, or the like, that allow a user to adjust different features of the apparatus. For example, the system may include a focus adjustment input device (e.g., knob, switch, slider switch, button, etc.) to adjust the focus of the apparatus. This adjustment device allows the user to control the amount of voltage applied to different areas of the liquid crystal material thereby resulting in an adjustment to the focus of the device. In an embodiment the voltage control is controlled by a potentiometer. Changing the value of the potentiometer results in a change to the amount of voltage applied to an area.

In one embodiment, the focus of the device may be controlled by a processor that adjusts the voltage applied to different areas of the liquid crystal material. For example, a user may identify a specific focal value for different areas of the lens. The user may then provide this focal value to a processor which can identify the voltage required to result in the specified focal value. The processor can then provide instructions to another device, for example, power source, potentiometer, and the like, to adjust the voltage of the lens. While this system can be used in either the near-eye display or the eyeglass replacement lens, such an embodiment may be particularly useful in the case of eyeglass replacement lenses. For example, rather than having to replace the lens in a pair of eyeglasses, the optometrist or user can merely provide instructions to the device to modify the corrective value of the lens. Thus, with a simple processor instruction the eyeglass wearer has "new" corrective lenses having the desired corrective value without actually having to get new lenses.

In an embodiment, the hard plastic prisms feature peaks that are a few microns across. These very small features reduce the distortion effect of higher intensity light seen in concentric rings typically associated with a Fresnel lens. Additionally, the hard plastic prisms are surrounded by a liquid crystal material which further lessens the higher intensity concentric circles of light from the Fresnel lens. The liquid crystal material, which is voltage-sensitive, can be adjusted to further lessen the concentric circles of higher light intensity from the Fresnel lens. For example, application of a voltage across the lens or prism causes the prism shape to change, thereby breaking up the typical bright ring pattern created by the Fresnel lens. Thus, the brighter light of the ring will be delivered to a wider variety of points and making the distortion of the Fresnel lens prism peaks harder to see.

In an embodiment, the replacement lens is not used with a near-eye display, as discussed herein throughout. Rather, the replacement lens is placed in conventional eyeglass frames. The replacement lens is focused to correct the user's eyesight. The functionality and design of the replacement lens is similar to embodiments disclosed herein.

In an embodiment, the eyeglass replacement lens may be coated with an additional layer. These layers may include anti-scratch, anti-glare, water repellant, light reflective, photosensitive or thermal-sensitive darkening coatings, and the like. Such layers may be similar to layers that are typically found on eyeglasses. Additionally, these layers may be applied using techniques typically used to apply these layers to standard eyeglasses.

In the application, "a processor" may control the focus of the replacement lens, control the display screen, control the interaction of the display device with the eyeglass replacement lens, or any combination of processing performed by the device in part or in whole. In other words, reference to "a processor" may be the same or a different processor, which may perform one or more functions associated with the near-eye display, replacement lens, or the like A number of components of the device 1000 are stored in memory 1004. In particular, 3D display logic 1030 is all or part of one or more computer processes executing within CPU 1002 from memory 1004 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Images 1040 is data representing one or more images and/or views which may be stored in memory 1004.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. An apparatus, comprising:
    a processor;
    a voltage source operatively coupled to the processor; and
    at least two optic lenses operatively coupled to the voltage source, wherein each of the at least two optic lenses comprise voltage sensitive material;
    wherein the voltage source is controlled by the processor to provide voltage to at least one of the at least two optic lenses causing a change in focal length of the at least one of the at least two optic lenses, wherein the change in focal length causes a change in diopter of at least one optic lens, thereby permitting a user to view a system without corrective lenses.

2. The apparatus of claim 1, wherein the voltage sensitive material comprises liquid crystal.

3. The apparatus of claim 1, further comprising a voltage adjustment device.

4. The apparatus of claim 3, wherein the voltage adjustment device comprises a potentiometer.

5. The apparatus of claim 1, wherein at least one of the at least two optic lenses comprises a modified Fresnel lens.

6. The apparatus of claim 1, wherein at least one of the at least two optic lenses comprises a plastic substrate, at least one electrode array, a liquid crystal material, and a glass substrate.

7. The apparatus of claim 1, wherein each of the at least two optic lenses comprise regions, and wherein the voltage of the voltage source that is applied is different at different regions.

8. The apparatus of claim 1, wherein at least one of the at least two optic lenses comprises a coating for changing a characteristic of the at least one of the at least two optic lenses.

9. The apparatus of claim 1, wherein each of the at least two optic lenses are calibrated for a particular user.

10. The apparatus of claim 1, wherein changing a focus of the at least one of the at least two optic lenses comprises adjusting the diopter effect of at least one of the at least two optic lenses.

11. A virtual reality system, comprising:
    a processor;
    a voltage source operatively coupled to the processor;
    at least two optic lenses operatively coupled to the voltage source, wherein each of the at least two optic lenses comprise voltage sensitive material;
    wherein the voltage source is controlled by the processor to provide voltage to at least one of the at least two optic lenses causing a change in focal length of the at least one of the at least two optic lenses, wherein the change in focal length causes a change in diopter of at least one optic lens, thereby permitting a user to view a system without corrective lenses;
    a holder for the at least two optic lenses; and
    a display operatively coupled to a processor, wherein the display is located behind the at least two optic lenses with respect to a user.

12. The system of claim 11, wherein the voltage sensitive material comprises liquid crystal.

13. The system of claim 11, further comprising a voltage adjustment device, wherein the voltage adjustment device comprises a potentiometer.

14. The system of claim 11, wherein at least one of the at least two optic lenses comprises a modified Fresnel lens.

15. The system of claim 11, wherein at least one of the at least two optic lenses comprises a plastic substrate, at least one electrode array, a liquid crystal material, and a glass substrate.

16. The system of claim 11, wherein each of the at least two optic lenses comprise regions, and wherein the voltage of the voltage source that is applied is different at different regions.

17. The system of claim 11, wherein at least one of the at least two optic lenses comprises a coating for changing a characteristic of the at least one of the at least two optic lenses.

18. The system of claim 11, wherein each of the at least two optic lenses are calibrated for a particular user.

19. The system of claim 11, wherein changing a focus of the at least one of the at least two optic lenses comprises adjusting the diopter effect of at least one of the at least two optic lenses.

20. A pair of eyeglasses, comprising:
- an eyeglass frame;
- a processor operatively coupled frame;
- a voltage source operatively coupled to the processor; and
- at least two optic lenses located within the eyeglass frame and operatively coupled to the voltage source, wherein each of the at least two optic lenses comprise voltage sensitive material;
- wherein the voltage source is controlled by the processor to provide voltage to at least one of the at least two optic lenses causing a change in focal length of the at least one of the at least two optic lenses, wherein the change in focal length causes a change in diopter of at least one optic lens, thereby permitting a user to view a system without corrective lenses.

* * * * *